United States Patent
Kulangara Muriyil et al.

(10) Patent No.: US 11,899,704 B2
(45) Date of Patent: Feb. 13, 2024

(54) SYSTEMS AND METHODS FOR EXTRACTING, DIGITIZING, AND USING ENGINEERING DRAWING DATA

(71) Applicant: Tata Consultancy Services Limited, Mumbai (IN)

(72) Inventors: Robin Tommy Kulangara Muriyil, Thiruvananthapuram (IN); Athira Krishnan Remadevi, Thiruvananthapuram (IN); Aswathy Sreelekha Krishna, Thiruvananthapuram (IN); Ajithkumar Manaparampil, Thiruvananthapuram (IN); Anand Gopinath, Thiruvananthapuram (IN)

(73) Assignee: Tata Consultancy Services Limited, Mumbai (IN)

( * ) Notice: Subject to any disclaimer, the term of this patent is extended or adjusted under 35 U.S.C. 154(b) by 19 days.

(21) Appl. No.: 17/812,895

(22) Filed: Jul. 15, 2022

(65) Prior Publication Data

US 2023/0109144 A1    Apr. 6, 2023

(30) Foreign Application Priority Data

Sep. 3, 2021    (IN) .............................. 202121040056

(51) Int. Cl.
*G06F 16/35*    (2019.01)
*G06V 30/422*    (2022.01)
*G06V 30/412*    (2022.01)

(52) U.S. Cl.
CPC ............ *G06F 16/35* (2019.01); *G06V 30/412* (2022.01); *G06V 30/422* (2022.01)

(58) Field of Classification Search
CPC ..... G06F 16/35; G06V 30/422; G06V 30/412
(Continued)

(56) References Cited

U.S. PATENT DOCUMENTS 5,493,679 A * 2/1996 Virgil ................... G06F 16/284
6,621,941 B1 * 9/2003 Syeda-Mahmood ......................
G06F 16/5854
707/E17.024
(Continued)

FOREIGN PATENT DOCUMENTS

WO    WO 2021/068061 A1 *    4/2021    ............. G06F 30/13

OTHER PUBLICATIONS

Sinha, Arka, et al., "Table Localization and Field Value Extraction in Piping and Instrumentation Diagram Images", ICDARW 2019, Sydney, NSW, Australia, Sep. 22-25, 2019, pp. 26-31.*
(Continued)

*Primary Examiner* — Robert Stevens
(74) *Attorney, Agent, or Firm* — Finnegan, Henderson, Farabow, Garrett & Dunner, LLP

(57) ABSTRACT

Re-usage of part of object or object is highly important in manufacturing industry as it can drastically reduce cost and time spent on manufacturing. However, lack of proper information about availability of similar parts leads to redesigning of similar part. Existing databases for engineering drawings do not store categorized information due to which performing feature-based search is not possible. Present application provides systems and methods for extracting, digitizing, and using engineering drawing data. The system receives engineering drawing document and extracts text data present in each cell of table provided in document. Once table data is extracted, isometric views and views other than isometric views that are present in document are identified by the system using pretrained machine learning based model. The system further extract view labels and coordinate information from identified views. The information extracted from document is then stored by the system as engineering drawing data for document.

19 Claims, 9 Drawing Sheets

(58) Field of Classification Search
USPC .......................................................... 707/737
See application file for complete search history.

(56) References Cited

U.S. PATENT DOCUMENTS

| | | | |
|---|---|---|---|
| 7,392,480 B2 | 6/2008 | Harrison | |
| 2002/0154818 A1* | 10/2002 | Najman | G06V 30/412 |
| | | | 382/199 |
| 2022/0130145 A1* | 4/2022 | Connary | G06V 20/10 |
| 2022/0318546 A1* | 10/2022 | Narang | G06F 40/169 |

OTHER PUBLICATIONS

Ondrejcek, Michal et al., "Information Extraction from Scanned Engineering Drawings", Technical Report, Date: Dec. 2019, Publisher: National Center for Supercomputing Applications, https://isda.ncsa.illinois.edu/peter/publications.techreports/2009/NCSA-ISDA-2009-001.pdf, 29 pages.

Sulaiman, Riza, et al., "A Study on Information Extraction Method of Engineering Drawing Tables", Title of the item: International Journal of Computer Applications, International Journal of Computer Applications, Date: Jul. 2012, vol. 50(16), pp. 43-47, Publisher: Research Gate, https:/www.researchgate.net/publication/232257784_A_Study_on_information_Extraction_Method_of_Engineering_Drawing_Tables/link/09e41507e57ef335c3000000/download, 6 pages.

Elyan, Eyad et al., "Symbols Classification in Engineering Drawings", International Joint Conference on Neural Networks (IJCNN), Date: Jul. 2018, Publisher: IEEE, https://www.researchgate.net/publication/327791936_Symbols_Classification_in_Engineering_Drawings/link/5bbf2437a6fdccf29792b103/download, 9 pages.

* cited by examiner receiving, by the DDEMS via the one or more hardware processors, a search request from a data searcher device associated with a data searcher, the search request comprising at least one of one or more search keywords, one or more engineering drawing views, an engineering drawing image associated with a searched object, and result count information  902 determining, by the DDEMS via the one or more hardware processors, one or more engineering drawing documents whose table data is matching with the one or more search keywords based on one or more predefined matching criteria  904 comparing, by the DDEMS via the one or more hardware processors, the one or more engineering drawing views with one or more primary views and one or more secondary views of each determined engineering drawing document to generate a feature-based comparison score for the corresponding determined engineering drawing document  906 arranging, by the DDEMS via the one or more hardware processors, the one or more determined engineering drawing documents in a list based on, at least in part of, a decreasing order of the feature-based comparison score obtained for each determined engineering drawing document and the result count information  908 displaying, by the DDEMS via the one or more hardware processors, the list on the data searcher device  910

SYSTEMS AND METHODS FOR EXTRACTING, DIGITIZING, AND USING ENGINEERING DRAWING DATA

PRIORITY CLAIM

This U.S. patent application claims priority under 35 U.S.C. § 119 to: Indian Patent Application No. 202121040056, filed on Sep. 3, 2021. The entire contents of the aforementioned application are incorporated herein by reference.

TECHNICAL FIELD

The disclosure herein generally relates to engineering drawing, and, more particularly, to systems and methods for extracting, digitizing, and using engineering drawing data.

BACKGROUND

Technical drawings that are used to specify geometric configurations required for manufacturing of a component/object are referred as engineering drawings. An engineering drawing document (EDD) created corresponding to a component generally include multiple views of the same component that is to be manufactured as every process involved in the manufacturing of the component depends on the information included in the engineering drawing document. So, the engineering drawing document serves as one of a basis for manufacturing of a component.

Manufacturing of components/products is an expensive process both in terms of cost and time. If a manufactured component can be reused in manufacturing field, it can save a lot of cost. But for reusing the component in manufacturing, information about availability of similar components is required. This lack of proper information regarding similar existing products is a cause of concern as it leads to manufacturing of similar components again and again overtime, which ultimately leads to wastage of time and money. This wastage can be avoided if proper information regarding similar existing products is easily available and accessible.

Few problems can be solved if a database is created for storing engineering drawings associated with components, but availability and accessibility of drawings continue to remain an issue as old engineering drawings have not been digitized leading to an unsorted and uncategorized database. Further, even if the information associated with the components is available and accessible, performing manual comparison between the engineering drawings associated with the products is a tedious task. Additionally, a huge amount of workforce may be required for performing the comparison which again leads to the added cost.

SUMMARY

Embodiments of the present disclosure present technological improvements as solutions to one or more of the above-mentioned technical problems recognized by the inventors in conventional systems. For example, in one aspect, there is provided a processor implemented method for extracting, digitizing, and using engineering drawing data. The method comprises receiving, by an Engineering Drawing Data Extraction and Management System (DDEMS) via one or more hardware processors, an engineering drawing document and a template information associated with the engineering drawing document from a data creator device associated with a data creator, the engineering drawing document comprising one or more engineering drawing views associated with an engineering drawing image of an object and one or more tables; identifying, by the DDEMS via one or more hardware processors, table location of a table of the one or more tables in the engineering drawing document based on the template information, the table comprising one or more cells; extracting, by the DDEMS via the one or more hardware processors, text data present in each cell of the one or more cells of the table in the table location as table data using a data extraction algorithm; identifying, by the DDEMS via the one or more hardware processors, one or more isometric views from the one or more engineering drawing views present in the engineering drawing document as one or more primary views using a color masking and an image area property technique; identifying, by the DDEMS via the one or more hardware processors, one or more secondary views from the one or more engineering drawing views using a pretrained machine learning based model; extracting, by the DDEMS via the one or more hardware processors, view labels and view coordinate information from one or more primary views and one or more secondary views using a view label extraction technique; and displaying, by the DDEMS via the one or more hardware processors, the table data, the one or more primary views, the one or more secondary views, the view labels and the view coordinate information as an engineering drawing data for the engineering drawing document on the data creator device.

In another aspect, there is provided an Engineering Drawing Data Extraction and Management System (DDEMS) for extracting, digitizing, and using engineering drawing data. The system comprises a memory storing instructions; one or more communication interfaces; and one or more hardware processors coupled to the memory via the one or more communication interfaces, wherein the one or more hardware processors are configured by the instructions to: receive an engineering drawing document and a template information associated with the engineering drawing document from a data creator device associated with a data creator, the engineering drawing document comprising one or more engineering drawing views associated with an engineering drawing image of an object and one or more tables; identify table location of a table of the one or more tables in the engineering drawing document based on the template information, the table comprising one or more cells; extract text data present in each cell of the one or more cells of the table in the table location as table data using a data extraction algorithm; identify one or more isometric views from the one or more engineering drawing views present in the engineering drawing document as one or more primary views using a color masking and an image area property technique; identify one or more secondary views from the one or more engineering drawing views using a pretrained machine learning based model; extract view labels and view coordinate information from one or more primary views and one or more secondary views using a view label extraction technique; and display the table data, the one or more primary views, the one or more secondary views, the view labels and the view coordinate information as an engineering drawing data for the engineering drawing document on the data creator device.

In yet another aspect, there are provided one or more non-transitory machine-readable information storage mediums comprising one or more instructions which when executed by one or more hardware processors cause a method for extracting, digitizing, and using engineering drawing data. The method comprises receiving, by an Engineering Drawing Data Extraction and Management System (DDEMS) via one or more hardware processors, an engineering drawing document and a template information associated with the engineering drawing document from a data creator device associated with a data creator, the engineering drawing document comprising one or more engineering drawing views associated with an engineering drawing image of an object and one or more tables; identifying, by the DDEMS via one or more hardware processors, table location of a table of the one or more tables in the engineering drawing document based on the template information, the table comprising one or more cells; extracting, by the DDEMS via the one or more hardware processors, text data present in each cell of the one or more cells of the table in the table location as table data using a data extraction algorithm; identifying, by the DDEMS via the one or more hardware processors, one or more isometric views from the one or more engineering drawing views present in the engineering drawing document as one or more primary views using a color masking and an image area property technique; identifying, by the DDEMS via the one or more hardware processors, one or more secondary views from the one or more engineering drawing views using a pretrained machine learning based model; extracting, by the DDEMS via the one or more hardware processors, view labels and view coordinate information from one or more primary views and one or more secondary views using a view label extraction technique; and displaying, by the DDEMS via the one or more hardware processors, the table data, the one or more primary views, the one or more secondary views, the view labels and the view coordinate information as an engineering drawing data for the engineering drawing document on the data creator device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 9 illustrates an exemplary flow diagram of a method for performing a cognitive engineering drawing search using the system of FIG. 1 and the DDEMS of FIG. 2, in accordance with an embodiment of the present disclosure.

DETAILED DESCRIPTION

Figure 1:
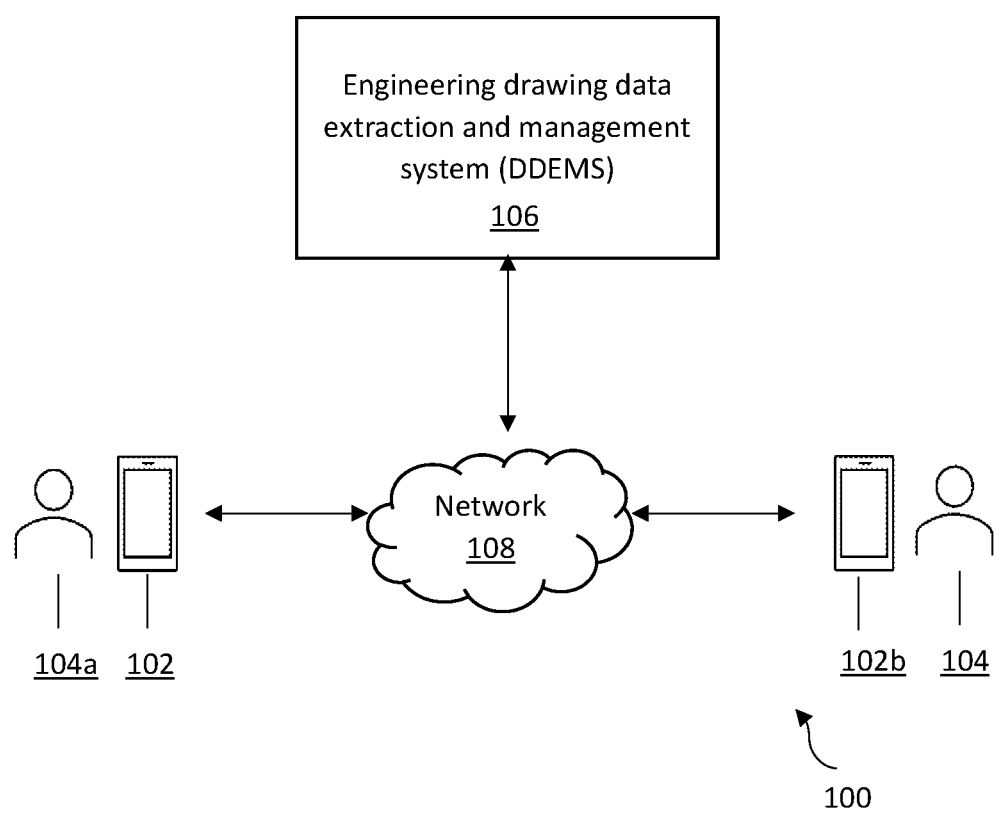
FIG. 1 is an example representation of an environment, related to at least some example embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

In manufacturing industry, re-usage of a part of an object or the object can reduce the cost as well as the time spent on manufacturing of the same part or the object. However, lack of proper information about availability of similar parts leads to redesigning of the similar products over time. Further, the databases that are maintained for engineering drawings do not store the categorized information about the engineering drawings, thereby performing a feature-based search, such as by using a part number or material used for a product or a part is not achievable by the systems available in the art. To address the above technical problem, systems and methods are provided by the present disclosure that digitizes the available engineering drawings by extracting and categorizing the data present in those engineering drawings. The system also facilitates feature and/or image-based searching for engineering drawings by using data stored for available engineering drawings. More specifically, an automated engineering drawing data digitizing mechanism is provided by the present disclosure to ensure easy availability and accessibility of available engineering drawings. In the present disclosure, an Engineering Drawing Data Extraction and Management System (DDEMS) (also referred as system and interchangeably used herein) is provided for extracting, digitizing, and using engineering drawing data. DDEMS receives an engineering drawing document associated with a product that a user wants to digitize. For extracting engineering drawing data, DDEMS extracts table data present in tables provided in the engineering drawing document and identifies different views of the product that are represented as engineering drawings available in the document. After the view identification using a pre-trained machine learning based model, DDEMS extracts view labels and view coordinate information from the identified views. DDEMS then stores the table data, the views, the view labels, and the view coordinate information as the engineering drawing data for the engineering drawing document.

Referring now to the drawings, and more particularly to FIGS. 1 through 9, where similar reference characters denote corresponding features consistently throughout the figures, there are shown preferred embodiments and these embodiments are described in the context of the following exemplary system and/or method.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, extracting data from engineering drawing, saving extracted data, etc. The environment 100 generally includes a plurality of user devices, such as a data creator device 102a and a data searcher device 102b, and an engineering drawing data extraction and management system (hereinafter referred as 'DDEMS') 106, each coupled to, and in communication with (and/or with access to) a network 108. It should be noted that two user devices are shown for the sake of explanation; there can be more or less number of user devices.

The network 108 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof.

Various entities in the environment 100 may connect to the network 108 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof.

The data creator device 102a is shown to be associated with a data creator 104a (e.g., a user or an entity such as an organization) who wants to digitize engineering drawings using the DDEMS 106. Similarly, the data searcher device 102b is shown to be associated with a data searcher 104b who wants to perform an engineering drawing search to check availability of objects that are similar to a searched object using the DDEMS 106. In an embodiment, the data creator device 102a and the data searcher device 102b can be a same user device. Example of the data creator device 102a and the data searcher device 102b include, but are not limited to, a personal computer (PC), a mobile phone, a tablet device, a Personal Digital Assistant (PDA), a voice activated assistant, a smartphone and a laptop.

The engineering drawing data extraction and management system (DDEMS) 106 includes one or more hardware processors and a memory. The DDEMS 106 is configured to perform one or more of the operations described herein. The DDEMS 106 is configured to receive an engineering drawing document via the network 108 from the data creator device 102a of the data creator 104a who wants to digitize an engineering drawing image created corresponding to an object by storing the information associated with the engineering drawing image. In general, the DDEMS 106, for digitizing engineering drawing image, scans, and extracts information from the received engineering drawing document. In a more illustrative manner, the DDEMS 106 facilitates detection of text and one or more engineering drawing views associated with the engineering drawing image provided in the engineering drawing document. Further, the DDEMS 106 performs categorization of the information extracted from the engineering drawing document for storing the information. The information extracted for the engineering drawing image is referred as the engineering drawing data. Once the information is categorized, the DDEMS 106 stores the engineering drawing data corresponding to the received engineering drawing document in a database.

The DDEMS 106 utilizes a data extraction algorithm (e.g., data extraction technique(s) as known in the art) for extracting text data present in the engineering drawing image. The DDEMS 106 also utilizes a color masking and an image area property technique for identifying isometric views present in the engineering drawing image. Further, DDEMS 106 utilizes a pre-trained machine learning based model which may detect different kind of views other than the isometric views that are present in the engineering drawing image. Additionally, a view label extraction technique is utilized by the DDEMS 106 for assigning view labels to the identified views.

In one embodiment, the DDEMS 106 is configured to receive search request via the network 108 from the data searcher device 102b associated with data searcher 104b who wants to perform either a text-based and/or a cognitive engineering drawing search to access objects whose engineering drawing images are similar to an object being searched. In another embodiment, the search request may be received from the data searcher device 102b and/or data creator device 102a locally without the use of any network/internet—such scenarios can be realized when the DDEMS 106 is implemented within the data searcher device 102b and/or the data creator device 102a. In such scenarios, the data searcher device 102b and data creator device 102a can be the same device. It is to be understood by a person having ordinary skill in the art or person skilled in the art that such scenarios as described herein shall not be construed as limiting the scope of the present disclosure. The search request may include keywords and/or engineering drawing image and/or engineering drawing views. Based on a type of the engineering drawing search i.e., the text-based search and/or the cognitive engineering drawing search, the DDEMS 106 looks for one or more engineering drawing documents in the database whose engineering drawing data is matching with information included in the search request. Thereafter, the DDEMS 106 facilitates display of the one or more engineering drawing documents that are found to be similar with the searched object on the data searcher device 102b.

The data searcher 104b can now access and view information associated with the similar objects on the data searcher device 102b.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100 (e.g., refer scenarios described above).

Figure 2:
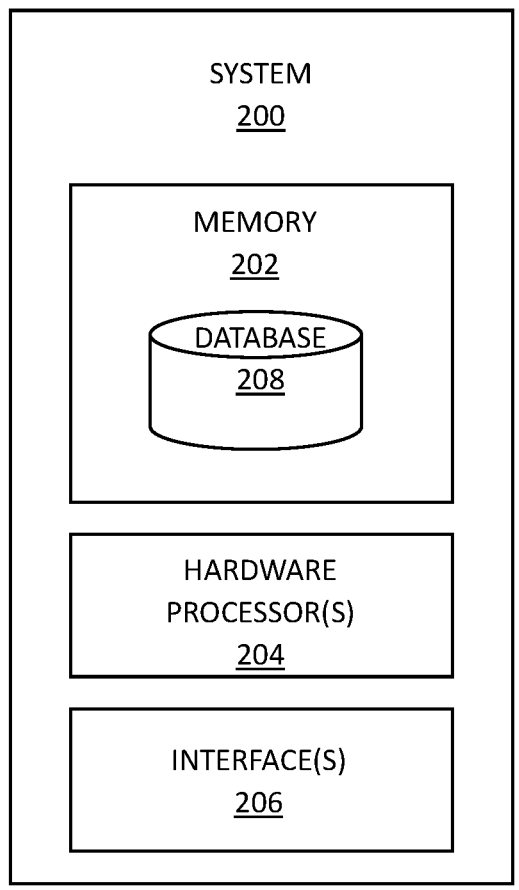
FIG. 2 illustrates an exemplary block diagram of an engineering drawing data extraction and management system (DDEMS) for extracting, digitizing, and using engineering drawing data, in accordance with an embodiment of the present disclosure.

FIG. 2 illustrates an exemplary block diagram of an engineering drawing data extraction and management system (DDEMS) 200 for extracting, digitizing, and using engineering drawing data, in accordance with an embodiment of the present disclosure. In an embodiment, the engineering drawing data extraction and management system (DDEMS) may also be referred as system and may be interchangeably used herein. The system 200 is similar to the DDEMS 106 explained with reference to FIG. 1. In some embodiments, the system 200 is embodied as a cloud-based and/or SaaS-based (software as a service) architecture. In some embodiments, the system 200 may be implemented in a server system. In some embodiments, the system 200 may be implemented in a variety of computing systems, such as laptop computers, notebooks, hand-held devices, workstations, mainframe computers, and the like.

In an embodiment, the system 200 includes one or more processors 204, communication interface device(s) or input/output (I/O) interface(s) 206, and one or more data storage devices or memory 202 operatively coupled to the one or more processors 204. The one or more processors 204 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory 202.

The I/O interface device(s) 206 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 208 can be stored in the memory 202, wherein the database 208 may comprise, but are not limited to, engineering drawing data associated with one or more engineering drawing documents that are digitized using the system 200, and one or more search requests for searching one or more objects that are similar to searched objects, and the like. The memory 202 further comprises (or may further comprise) information pertaining to input(s)/output(s) of each step performed by the systems and methods of the present disclosure. In other words, input(s) fed at each step and output(s) generated at each step are comprised in the memory 202 and can be utilized in further processing and analysis.

Figure 3:
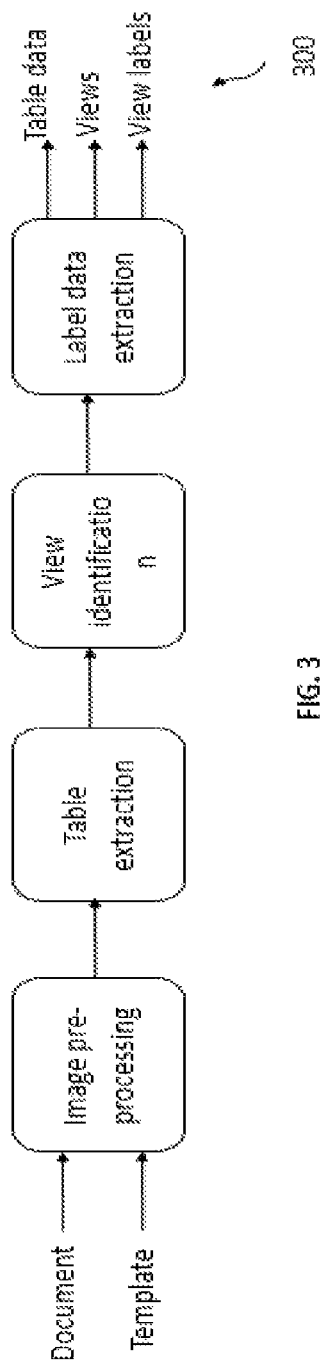
FIG. 3 illustrates a schematic block diagram representation of an extraction process associated with the system of FIG. 2 or the DDEMS of FIG. 1 for extracting information from an engineering drawing image, in accordance with an embodiment of the present disclosure.

FIG. 3, with reference to FIGS. 1-2, illustrates a schematic block diagram representation 300 of an extraction process associated with the system 200 of FIG. 2 or the DDEMS 106 of FIG. 1 for extracting information from an engineering drawing image, in accordance with an embodiment of the present disclosure.

Figure 4:
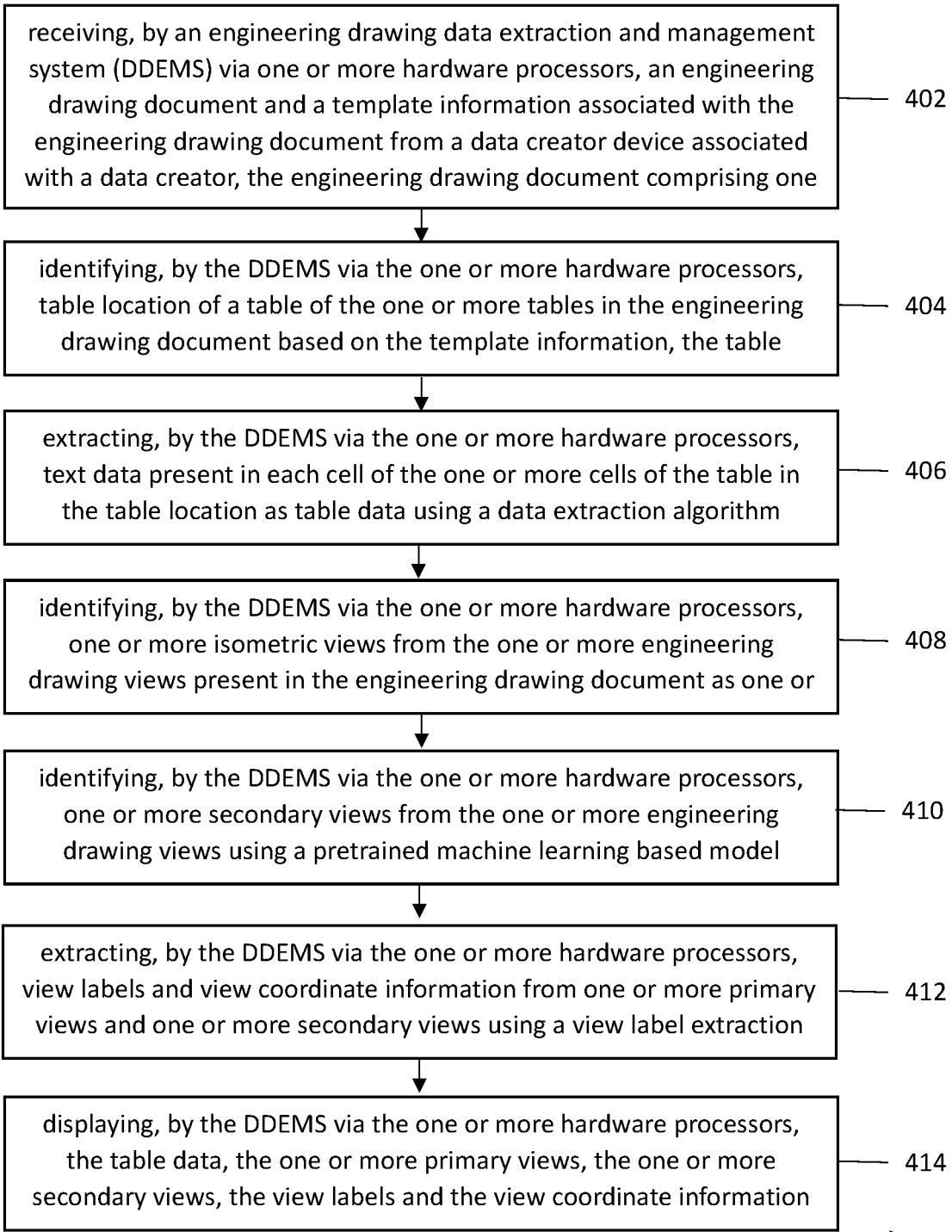
FIG. 4 illustrates an exemplary flow diagram of a method for extracting, digitizing, and using engineering drawing data using the system of FIG. 2 and the DDEMS of FIG. 1, in accordance with an embodiment of the present disclosure.

FIG. 4, with reference to FIGS. 1-3, illustrates an exemplary flow diagram 400 of a method for extracting, digitizing, and using engineering drawing data using the system 200 of FIG. 2 or the DDEMS 106 of FIG. 1, in accordance with an embodiment of the present disclosure. In an embodiment, the system(s) 200 comprises one or more data storage devices or the memory 202 operatively coupled to the one or more hardware processors 204 and is configured to store instructions for execution of steps of the method by the one or more hardware processors 204. The steps of the method of the present disclosure will now be explained with reference to the components of the system 200 as depicted in FIG. 2, and the DDEMS 106 of FIG. 1. In an embodiment of the present disclosure, at step 402, the one or more hardware processors 204 of the engineering drawing data extraction and management system (DDEMS) 200 receive an engineering drawing document and a template information associated with the engineering drawing document from a data creator device (e.g., the data creator device 102a) associated with a data creator (e.g., the data creator 104a). The engineering drawing document includes one or more engineering drawing views associated with an engineering drawing image of an object and one or more tables. The above step 402 can be better understood by way of following description:

In an embodiment of the present disclosure, the expression "engineering drawing document" refers a document including a collection of engineering drawings associated with an object. The object can be any object that is capable of being manufactured using the engineering drawings (e.g., a two-dimensional and/or a three-dimensional object, and the like). The collection of engineering drawings associated with the object are collectively referred as the engineering drawing image of the object. As each engineering drawing in the collection of engineering drawings may be providing a different view of the object, we refer them as engineering drawing views. So, one or more engineering drawing views are associated with the engineering drawing image of the object.

In one embodiment, the engineering drawing document also includes one or more tables that may contain some important information regarding the object to be manufactured and the engineering drawing document. Example of the information that may be included in the one or more tables include part name, revision category, material used (or to be used), dimensions, company details, names of persons involved in drawings, etc. Such information shall not be construed as limiting the scope of the present disclosure.

Generally, as per the engineering drawing standards, one big table is the most important table among the one or more tables that are present. In the engineering drawing document, position of that important table is not fixed, and the table can be at any location, such as top, bottom, center etc., in the engineering drawing document. So, while providing the engineering drawing document, the data creator also provides the relative position of the table such as 'table at top', 'table at bottom' etc., in the engineering drawing document and that is referred as the template information. Alternatively, the DDEMS 200 may automatically identify such position of the important table and annotate with suitable label accordingly. Such annotation may either be by the DDEMS 200 on its own or via one or more inputs from the user (e.g., data searcher/data creator), in one example embodiment.

In an embodiment of the present disclosure, at step 404, the one or more hardware processors 204 of the engineering drawing data extraction and management system (DDEMS) 200 identify table location of a table of the one or more tables in the engineering drawing document based on the template information. In one embodiment, the table includes one or more cells. The above step 304 is better understood by way of following description:

As discussed previously, the big table is the important table and the location of same table among the one or more tables is to be identified at this step using the template information provided by the data creator. As tables generally include horizontal and vertical lines and is of rectangular/square shape, the location of the table is identified by passing the engineering drawing image through horizontal and vertical line filters and external vertex identifier that performs a check for rectangular shape at the relative position of the table provided in the template information. If the rectangular/square shape is identified in the relative position, the hardware processors 104 consider that location as the table location.

In one embodiment, the table includes a plurality of rows and columns. A unit in the table where a row and a column intersect is refereed as a cell. The table generally includes one or more cells. Each cell of the table stores some text data. However, in some scenarios, not all cells contain information/text/values, etc.

Further, the step of identifying the table location of the table of the one or more tables in the engineering drawing document based on the template information is preceded by: pre-processing the received engineering drawing document to obtain a pre-processed engineering drawing document. For performing pre-processing of the engineering drawing document to obtain the pre-processed engineering drawing document, the one or more hardware processors 204 of the DDEMS 200 passes the engineering drawing image included in the engineering drawing document through one or more pre-processing steps that eliminates noise from the engineering drawing image, which further improves the readability of the engineering drawing image. The pre-processed engineering drawing document includes pre-processed engineering drawing views associated with the engineering drawing image. The pre-processing of the engineering drawing document may be performed by the DDEMS 200 using any pre-processing technique known in the art wherein the pre-processing technique may comprise but not limited to, removal of noise, filtering unwanted regions, enhance the image quality and resolution, and the like.

At step 406 of the present disclosure, the one or more hardware processors 204 of the DDEMS 200 extract the text data present in each cell of the one or more cells of the table in the table location as table data using a data extraction algorithm. The data extraction algorithm is better understood by way of following description:

The hardware processors 204 of the DDEMS 200 may use the data extraction algorithm to extract text data present in each cell of the table present in the table location. The data extraction algorithm first involves identification and extraction of a table region from the pre-processed engineering drawing document using the table location. So, once the table location is known to the DDEMS 200, the hardware processors 204 identify the table region associated with the table based on one or more pre-defined criteria. The one or more pre-defined criteria include identification of image contours of the rectangular shape for identification of maximum area surrounding the rectangular shape. The identified maximum area is refereed as the table region associated with the table. The hardware processors 204 further extract the table region associated with the table in the pre-processed engineering drawing document.

Once the table region is extracted, the hardware processors 204 may try to extract cell data included in one or more cells of the table(s) present in the table region. However, extraction of the cell data present in cell(s) of the table may not be possible at this stage due to the very small size of the cell data. So, to improve the data content readability of each cell in the table, the hardware processors 204 of the DDEMS 200 as part of the data extraction algorithm perform rescaling on the table region using a predefined scale factor to obtain a rescaled table. In an embodiment, the scale factor value of 2.75 may be used to perform the rescaling on the table region. The hardware processors 204 further apply a thresholding on the rescaled table using a thresholding technique to obtain a clear table. In an embodiment, without limiting the scope of the invention, threshold of '225-255' as white while rest as '0' or black may be applied over pixels of clear table to ensure that the rescaled table is readable. Thereafter, the hardware processors 204 perform erosion of the clear table to obtain an eroded table.

As the eroded table offers improved text data readability, the hardware processors 204 may now perform extraction of the text data present in each cell of the eroded table using a data mapping mechanism. The data mapping mechanism is better understood by way of following description:

While readability of the text data is improved in the eroded table, mapping of text data present in each cell of the eroded table is still a challenge due to the non-structured format of the table. Generally, tables do not follow a fixed template. So, the text data for an identified cell can be present in the same cell or neighboring cell or can be absent in the table. The placement of the text data can also be different i.e., the text data can be placed horizontally, vertically or tilted and font characteristics can also vary from one cell to another cell. Due to these limitations, data extraction in prior arts is limited to title extraction or a specific data extraction, like version or data extraction for only a particular type of identified table. The objective of the data mapping mechanism used at step 406 of the present disclosure is to extract maximum text data this is present in the table i.e., the eroded table by taking into consideration the various placements and sizes of the text data.

For extracting text data, the hardware processors 204 of the DDEMS 200 as part of the data mapping mechanism identify each cell that is present in the table. In an embodiment, for performing cell identification, the hardware processors 204 pass the engineering drawing image through vertical and horizontal line filters in which the coefficients are fine-tuned for identification of cells. In an embodiment, the coefficients that are fine-tuned include parameters of kernel size of erosion and dilation to control extend of darkening of detected vertical and horizontal lines of each cell. After the identification, the hardware processors 204 of the DDEMS 200 perform reading of the text data present in each identified cell. In one embodiment, the hardware processors 204 may use Optical Character Recognition (OCR) (e.g., OCR technique as known in the art) for reading text data present in each cell of the table provided in the engineering drawing image. Based on the text data of each cell, the hardware processors 204 identify an expected data type for the respective identified cell. Thereafter, the hardware processors 204 perform a comparison of actual data type and the expected data type for the each identified cell. The comparison may help in determining a probable data for the corresponding cell.

In one embodiment, if the actual data type and the expected data type of an identified cell are found to be same/identical, the hardware processors 204 considers the text data present in the cell as the probable data for the same cell. Otherwise, the hardware processors 204 check text data of neighboring cells around the identified cell to determine the probable data for the identified cell. In an embodiment, the probable data is determined based on the expected data type i.e., the expected data type for the identified cell and the text data present in the neighboring cells are checked to determine the probable data for the cell. For example, consider a scenario where the expected data type for an identified cell is found to be 'date-type', so the hardware processors 204 may check the text data present in neighboring cells to find a date entry. If the date entry in any neighboring cell is found/determined, the date entry found in the neighboring cell is considered as the probable data for the identified cell. Additionally, in case of conflict where the expected data type for the identified cell and the data type of the neighboring cells are found to be similar e.g., date and drawn date and in cases where two or more different data types are present in one field e.g., date and name, the hardware processors may select the text data written on either top or left as the probable data for the identified cell as the DDEMS 200 assumes that the test data is written from either top to bottom or left to right in case of the tables.

Further, upon checking the text data of the neighboring cells if multiple data values are found to be a (potential) candidate for the identified cell, the hardware processors 204 may list the probable data values in a decreasing order of probability and the data value with highest probability may be considered as the probable data for the identified cell, in one embodiment of the present disclosure.

In an embodiment, if hardware processors 204 found that the text data present in the identified cell is rotated, the hardware processors 204 may apply one or more rotation techniques (e.g., rotation techniques as known in the art) on the text data to obtain the actual text data present in the identified cell.

In one embodiment, if the hardware processors 204 are not able to find the probable data for the identified cell even after checking the entries of the neighboring cells, the probable data may be marked as empty for the identified cell.

The hardware processors 204 of the DDEMS 200 may save the probable data identified using the data mapping mechanism as the text data for each identified cell in the database 208.

Once the text data present in the table i.e., the eroded table is extracted using the data extraction algorithm and the data mapping mechanism, the hardware processors 204 mask the table region associated with the table in the pre-processed engineering drawing document for further processing of the engineering drawing document.

In an embodiment of the present disclosure, at step 408, the one or more hardware processors 204 of the DDEMS 200 identify one or more isometric views from the one or more engineering drawing views i.e., the pre-processed engineering drawing views present in the pre-processed engineering drawing document as one or more primary views using a color masking and an image area property technique. The above step 408 is better understood by way of following description.

Most commonly seen views in the engineering drawing image include top views, bottom views, front views, rear views, right side views, left side views, assembly views, and isometric views. The engineering drawing views present in the engineering drawing document are closely related and two different engineering drawing views are so dissimilar that a normal object detector cannot detect the difference between the two drawing views while detecting. Further, perspective used while drawing an engineering drawing view can change from one drawing view to another as it is selected by a designer based on the convenience. So, using a generalized approach, such as a feature-based technique may not work well for differentiating between different drawing views of the same object.

Among all the engineering drawing views that are present in an engineering drawing document, the isometric views look different than the other views. An isometric view is generally represented with some colour (or color). In case the isometric view is drawn without using any colour i.e., drawn using black, white or grey colour, the isometric view is mostly shaded, thereby making it look different from other engineering drawing views. It should be noted that in engineering drawings, the shaded representations are only used to represent isometric views. So, the hardware processors 204 utilizes this color and contour difference for identifying one or more isometric views present in the engineering drawing image. Firstly, the hardware processors 204 apply a color masking technique in which the engineering drawing image with masked table is passed through a non-binary filtering mask that separates one or more coloured segments present in the engineering drawing image. Secondly, the hardware processors 204 apply an image area property technique over the separated one or more coloured segments to segment the one or more isometric views present in the engineering drawing image as one or more primary views. In an embodiment, the hardware processors 204 under the image area property technique uses contour area of the one or more coloured segments to detect one or more isometric views/primary views. A colour segment whose contour area is greater than a predefined threshold is considered as an isometric view/primary view by the hardware processors 204.

In an embodiment, the hardware processors 204 may also perform masking of the identified one or more isometric views in the pre-processed engineering drawing document before performing the step 410.

At step 410 of the present disclosure, the one or more hardware processors 204 of the DDEMS 200 identify one or more secondary views from the one or more engineering drawing views i.e., pre-processed engineering drawing views using a pretrained machine learning based model. In an embodiment, the one or more secondary views include one or more of front views, rear views, left side views, top views, bottom views, right side views, assembly views, and invalid views associated with the engineering drawing image of the object. In one embodiment, the engineering drawing views whose identification is not possible are considered as the invalid views. In an embodiment, the pretrained machine learning based model is a RetinaNet model. The working of the pretrained machine learning based model for identification of the one or more secondary views can be better understood by way of following description.

Generally, the front, top, bottom, left and right-side views are placed relatively among the other one or more engineering drawing views that are present in the engineering drawing image. A machine learning based model is trained to identify one or more engineering drawing views (referred as the secondary views) other than the isometric views that are present in the engineering drawing image using contours of the engineering drawing views. The process of creating a dataset for training the machine learning based model and the process of training the machine learning based model for view identification is explained in detail with reference to FIGS. 5 and 6A-6C, respectively.

The hardware processors 204 may provide the engineering drawing document with the masked table and the one or more isometric views to the pre-trained machine learning based model that may (or may not) perform some processing to provide some output associated with engineering drawing views. The hardware processors 204 may then use the output of the machine learning based model to identify the one or more secondary views that are present in the engineering drawing image.

In one embodiment, the pre-trained machine learning based model, upon receiving the engineering drawing document, identifies potential contour of each engineering drawing view of the remaining one or more engineering drawing views that are present in the engineering drawing image. The pre-trained machine learning based model also identifies a relative position of each engineering drawing view from the identified contour of the respective engineering drawing view.

Further, the pre-trained machine learning based model mark the identified contour of each engineering drawing view with a bounding box. Thereafter, the pre-trained machine learning based model performs cropping of the bounding boxes marked in the engineering drawing image. The cropped bounding boxes along with their associated engineering drawing views are further passed through an image classifier by the pre-trained machine learning based model to predict a probable secondary view for each engineering drawing view. Examples of the image classifier that can be used include support vector classifier (SVC), random forest etc. The pre-trained machine learning based model provides the relative position and probable secondary view information of each engineering drawing view as an output to the hardware processors 204 of the DDEMS 200. For example, if an engineering drawing view is identified to be present at the top and the probable secondary view for the same engineering drawing view is predicted as top view, then the pre-trained machine learning based model provides the 'top position' as relative position of the engineering drawing view and the 'top view' as the probable secondary view information as the output.

The hardware processors 204, upon receiving the relative position and probable secondary view information of each engineering drawing view, identify each engineering drawing view as either front view, top view, left side view, right side view, bottom view based on the relative position and the probable secondary view information of the corresponding engineering drawing view. In an embodiment, the hardware processors 204 may classify an engineering drawing view as an 'assembly view' if the relative position of the corresponding engineering drawing view is found to be at a center in the engineering drawing image. Further, the hardware processors 204 categorize an engineering drawing view as an 'invalid view' if the relative position information is not available for the engineering drawing view or a discrepancy exist between the relative position and the probable secondary view information. For example, the relative position is identified as 'top left position' and 'top view' is identified as the probable secondary view information. In that case, the engineering drawing view may be marked as the 'invalid view'.

In an embodiment of the present disclosure, at step 412, the one or more hardware processors 204 of the DDEMS 200 extract view labels and view coordinate information from the one or more primary views and the one or more secondary views using a view label extraction technique. The view label extraction technique is explained in detail with reference to FIG. 8.

At step 414 of the present disclosure, the one or more hardware processors 204 of the DDEMS 200 display the table data, the one or more primary views, the one or more secondary views, the view labels and the view coordinate information as an engineering drawing data for the engineering drawing document on the data creator device (e.g., the data creator device 102a).

Once the engineering drawing data for the engineering drawing document is displayed on the data creator device, the DDEMS 200 further facilitates editing of the engineering drawing data by the data creator, such as the data creator 104a to obtain an updated engineering drawing data for the engineering drawing document. For example, consider a scenario where a front view drawing is shown as a top view drawing in the engineering drawing data displayed on the data creator device, so the data creator has the option to edit the displayed engineering drawing data to make corrections in the engineering drawing data. The corrected data may then be referred as the updated engineering drawing data. In case data creator does not make any changes in the engineering drawing data, still the same engineering data may be used as the updated engineering drawing data as an option to make changes in that engineering drawing data was made available to the data creator.

Once the updated engineering drawing data is available, the hardware processors 204 of the DDEMS 200 store the updated engineering drawing data for the engineering drawing document in a database, such as the database 208.

Figure 5:
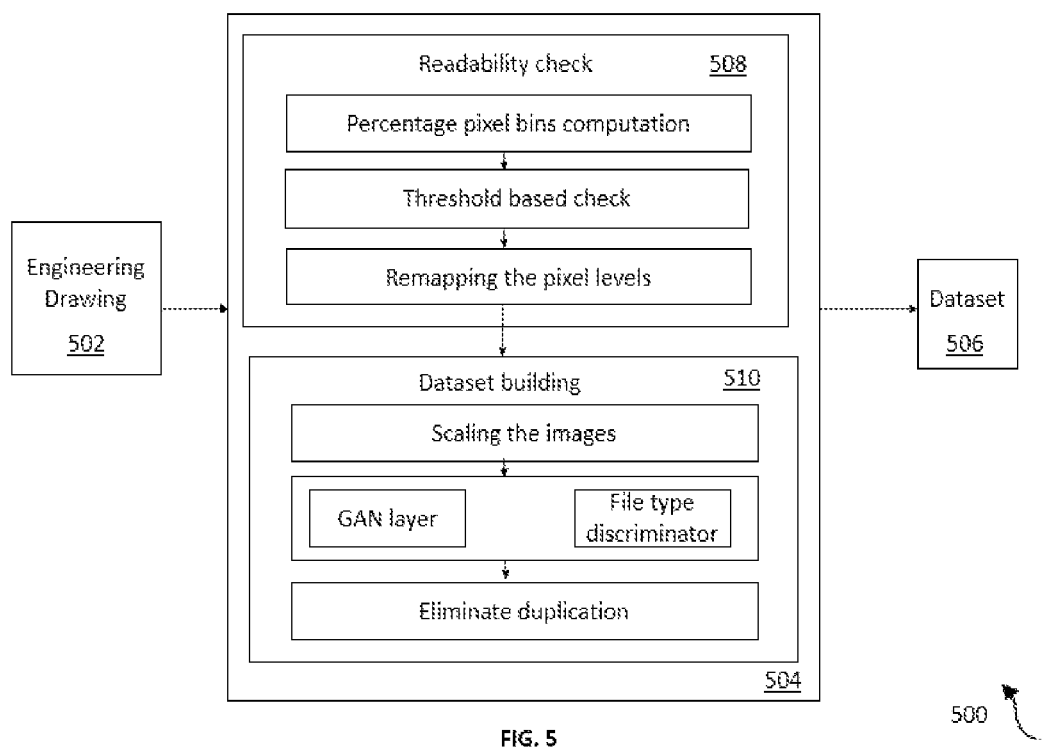
FIG. 5 illustrates a schematic block diagram representation of a dataset creation process followed for preparing a dataset for training a machine learning based model using a transfer learning technique, in accordance with an embodiment of the present disclosure.

FIG. 5, with reference to FIGS. 1 through 4, illustrates a schematic block diagram representation 500 of a dataset creation process followed for preparing a dataset for training a machine learning based model using a transfer learning technique, in accordance with an embodiment of the present disclosure. The trained machine learning based model may be used for identification of one or more secondary views as explained with reference to FIG. 4.

The block diagram representation 500 includes an engineering drawing block 502, a building block 504 and a dataset block 506.

In one embodiment, the engineering drawing block 502 includes a collection of a plurality of engineering drawing images that may be used to prepare the training dataset. The plurality of engineering drawings images may include wide range of engineering drawings images such as part drawing images, assembly drawing images, product drawing images, etc., to obtain diversity in the dataset. The engineering drawing block 502 provides the collection of the images to the building block 504.

The building block 504 includes a readability check block 508 and a dataset building block 510. In an embodiment, the readability check block 508 is configured to perform the readability check on the plurality of engineering drawings images that are received from the engineering drawing block 502. For performing readability check of each engineering drawings image of the plurality of engineering drawings images, the percentage contribution of each pixel bin present in the respective engineering drawings image is calculated. Thereafter, a threshold-based check is performed on the percentage contribution based on a predefined threshold to determine the readability of the text present in the engineering drawings image. In an embodiment, the predefined threshold value of '1%' may be used for performing threshold-based check. If the maximum percentage contribution found to be below the predefined threshold, the engineering drawings image is considered as unreadable. In that scenario, the image pixel levels are remapped to lower levels by passing the engineering drawings image through an image enhancer algorithm.

Once all the engineering drawings images are preprocessed and are considered readable, the engineering drawings images are provided to the dataset building block 510 that is configured to create the dataset. For creating the dataset using the plurality of received engineering drawings images, scaling is performed on each received engineering drawing image by maintaining an aspect ratio of the same engineering drawing image. Secondly, 'N' scaled up and scaled down images are created for each engineering drawing image for addressing the possible scale variations in the input engineering drawing image. In an embodiment, using a trial-and-error method, the value of N=3 is determined. This value may avoid the over training of the machine learning based model with scale variants of the same engineering drawing image. The same process is performed over all the engineering drawing images and the entire image set is then passed through a generative adversarial network (GAN). The output of the GAN may be a file type discriminator that may identify a type of each engineering drawing image passed through the GAN. The file type discriminator is configured to check whether content of each image is present after multiple chains of processing. So, in the algorithm incorporated in the file type discriminator, each engineering drawing image is initially smoothened using determined filter coefficients and then pixel bins are again computed and checked for the percentage occupancy. If the bins corresponding to white region predominates, then the same engineering drawing image is removed from further processing by the algorithm. Once the drawing types are identified for each engineering drawing image, one or more duplicate engineering drawing images that may be present in the entre image set are eliminated from the image set using the image features like vertices. After the elimination of the duplicate engineering drawing images, the engineering drawings images that are left in the image set are passed to the dataset block 506 from the building block 504. Thus, the dataset block 506 includes the engineering drawing images that are to be used as part of the dataset created for training the machine leaning based model.

Figure 6A:
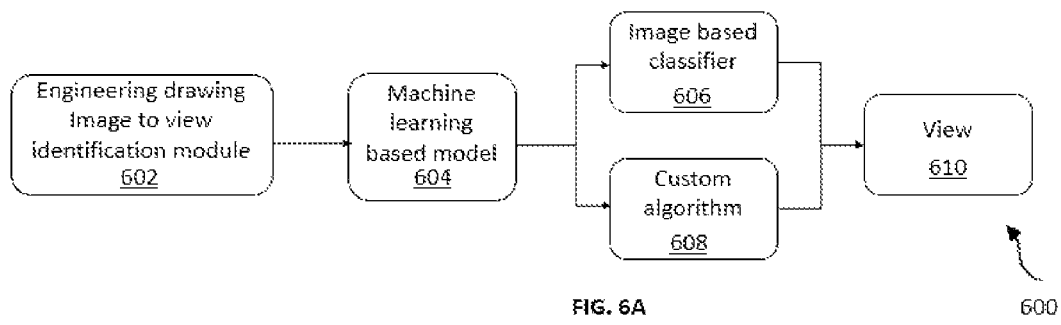
FIG. 6A illustrates a block diagram representation of a view identification training process associated with a training system for training a machine learning based model using the dataset created in FIG. 5 for performing identification of one or more secondary views available in an engineering drawing image, in accordance with an embodiment of the present disclosure.

FIG. 6A, with reference to FIGS. 1-5, illustrates a block diagram representation of a view identification training process associated with a training system for training a machine learning based model using the dataset created in FIG. 5 for performing identification of one or more secondary views available in an engineering drawing image, in accordance with an embodiment of the present disclosure. In an embodiment, the training system can be included in the DDEMS 200. The training system includes one or more data storage devices, or a memory operatively coupled to one or more hardware processors and is configured to store instructions for execution of steps of the method by the one or more processors.

As it is known, engineering drawing images have very small data entries. So, if the data present in an engineering drawing image is not processed with utmost care, the data retrieved from the engineering drawing image may not be of much use. For overcoming this problem, the training system uses the transfer learning technique (e.g., transfer learning technique as known in the art) to create datasets from the GAN as explained with reference to FIG. 5. Then, the created datasets are split in ratio of 80:20 for training and testing the test scenarios. Such ratio shall not be construed as limiting the scope of the present disclosure. Once the training datasets are created, the one or more views present in each engineering drawing image of the dataset are labelled (e.g., manually labelling by user(s)) for potential drawing views in the drawing. The potential drawing views can be front views, top views, left side views, right side views, bottom views, isometric views, and assembly views. Once, the labelling is done (e.g., manually), the engineering drawing images available in the dataset are passed to a view identification module of the training system where the potential views present in an input engineering drawing image are identified by the machine learning based model as part of training the machine learning based model. The working of the view identification module can be better understood by way of following description.

The training system provides each engineering drawing image available in the created datasets to the view identification module (refer, 602). In an embodiment, the view identification module creates two copies of each received engineering drawing image. Thereafter, the created two copies are provided to a machine learning based model (refer, 604). First copy of each received engineering drawing image is utilized to train the machine learning based model by performing view identification of each engineering drawing view available in the engineering drawing image using an image-based classifier (refer, 606). The view identification module may also compute a Convolutional Neural Network (CNN) prediction accuracy for each view identification made using the machine learning based model.

In one embodiment, a second copy is utilized by a custom algorithm available in the machine learning based model that is designed for view identification using a relative position, such as an angle of projection (refer, 608). The custom algorithm may identify view of each engineering drawing view of the one or more engineering drawing views available in the respective engineering drawing image. The view identification module may also compute a prediction score for each view that is identified using the custom algorithm.

Further, to take the decision on a view of each engineering drawing view available in respective engineering drawing image, the view identification module performs a comparison between the CNN prediction accuracy and the prediction score obtained for the corresponding engineering drawing view (refer, 610). In an embodiment, the view identification module may consider the view identified using the relative position as a final view in case the prediction score is found to be greater than 60% (e.g., threshold percentage) otherwise the machine learning based model identified view is considered as the final view. Such threshold percentage shall not be construed as limiting the scope of the present disclosure.

Figure 6B:
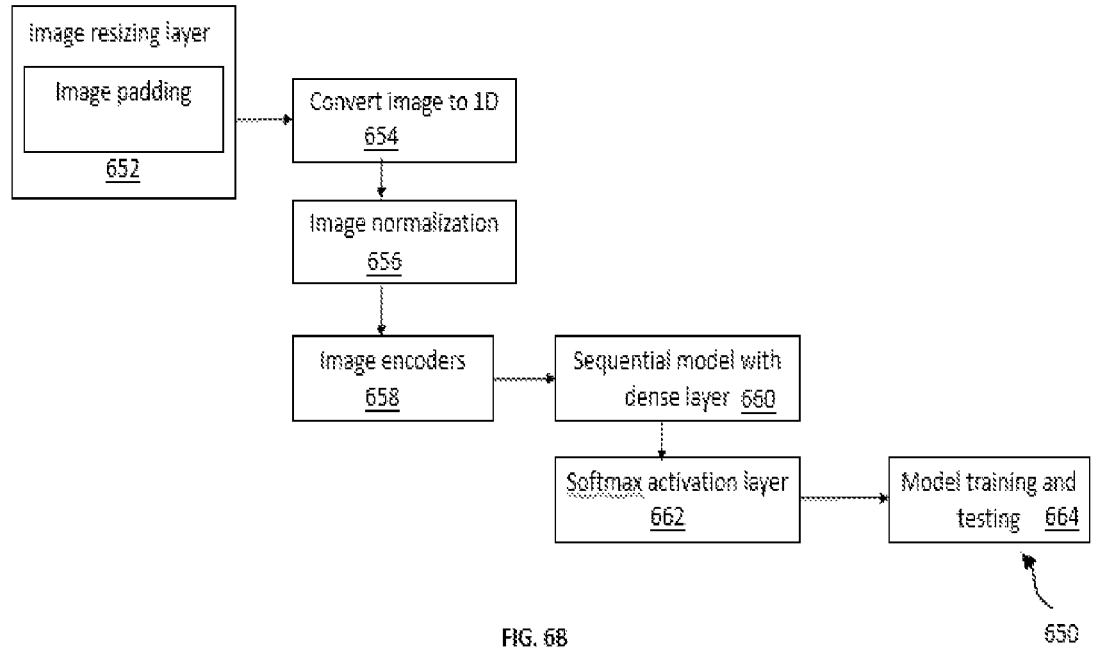
FIG. 6B illustrates an exemplary flow diagram of a method for training a machine leaning based model for view identification using an image-based classifier, in accordance with an embodiment of the present disclosure.

FIG. 6B, with reference to FIGS. 1-6A, illustrates an exemplary flow diagram 650 of a method for training a machine leaning based model for view identification using the image-based classifier, in accordance with an embodiment of the present disclosure. The method is performed by the training system of FIG. 6A.

In an embodiment of the present disclosure, at step 652, the one or more hardware processors of the training system perform resizing of each received engineering drawing view available in the engineering drawing image by applying an image padding technique. Once the image padding technique is applied over each engineering drawing view, a resized engineering drawing view image is obtained corresponding to each received engineering drawing view. In one embodiment, a padding pixel value of 0-255 is used in the image padding technique.

In an embodiment of the present disclosure, at step 654, the one or more hardware processors of the training system convert each resized engineering drawing view image into a one-dimensional (1D) image. It should be noted that 1D conversion can be performed using any technique known in the art.

In an embodiment of the present disclosure, at step 656, the one or more hardware processors of the training system apply an image normalization process on each 1D image to normalize the 1D image. At step 658, the one or more hardware processors of the training system passes each normalized image through an image encoder to obtain an encoded image corresponding to each normalized image.

In an embodiment of the present disclosure, at step 660, the one or more hardware processors of the training system create the machine learning based model with dense layers. At step 662, the one or more hardware processors of the training system make SoftMax activations on the machine learning based model.

In an embodiment of the present disclosure, at step 664, the one or more hardware processors of the training system train the machine learning based model with encoded images in which manually labelled potential drawing view is to be identified as a view label for the corresponding engineering drawing view. Once the machine learning based model is trained, the hardware processors of the training system may perform testing of the machine learning based model using the 20% of the datasets available for testing the machine learning based model.

Figure 7A:
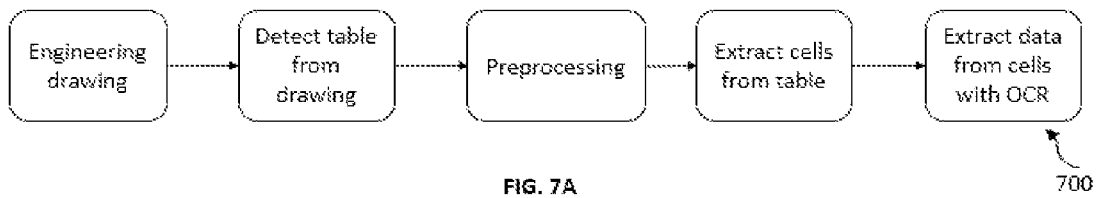
FIG. 7A illustrates a schematic block diagram representation of a data extraction algorithm used by the system of FIG. 2 or the DDEMS of FIG. 1 for extracting and mapping text data present in each cell of the table present in the engineering drawing document, in accordance with an embodiment of the present disclosure.

FIG. 7A, with reference to FIGS. 1 through 6, illustrates a schematic block diagram representation 700 of a table data extraction process associated with the system 200 of FIG. 2 or the DDEMS 106 of FIG. 1 for extracting table data from a table present in an engineering drawing document, in accordance with an embodiment of the present disclosure.

The table data extraction process for extracting table data from the table is explained in detail with reference to FIG. 4 and the description is not reiterated herein for the sake of brevity.

Figure 7B:
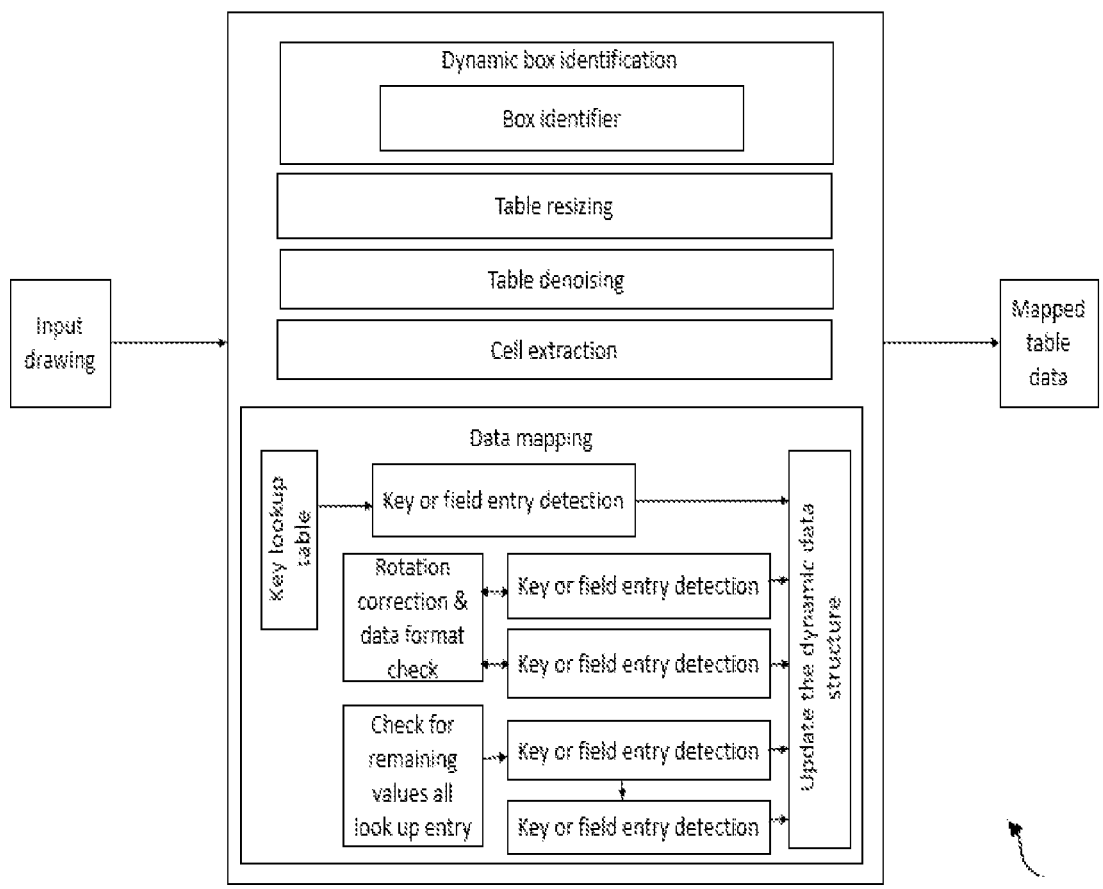
FIG. 7B illustrates a schematic block diagram representation of a data extraction algorithm used by the system of FIG. 2 or the DDEMS of FIG. 1 for extracting and mapping text data present in each cell of the table present in the engineering drawing document, in accordance with an embodiment of the present disclosure.

FIG. 7B, with reference to FIGS. 1 through 7A, illustrates a schematic block diagram representation 750 of a data extraction algorithm used by the system 200 of FIG. 2 or the DDEMS 106 of FIG. 1 for extracting and mapping text data present in each cell of the table present in the engineering drawing document, in accordance with an embodiment of the present disclosure.

The process of using the data extraction algorithm for extracting and mapping text data present in each cell of the table is explained in detail with reference to FIG. 4 and has not been explained herein for the sake of brevity.

Figure 8:
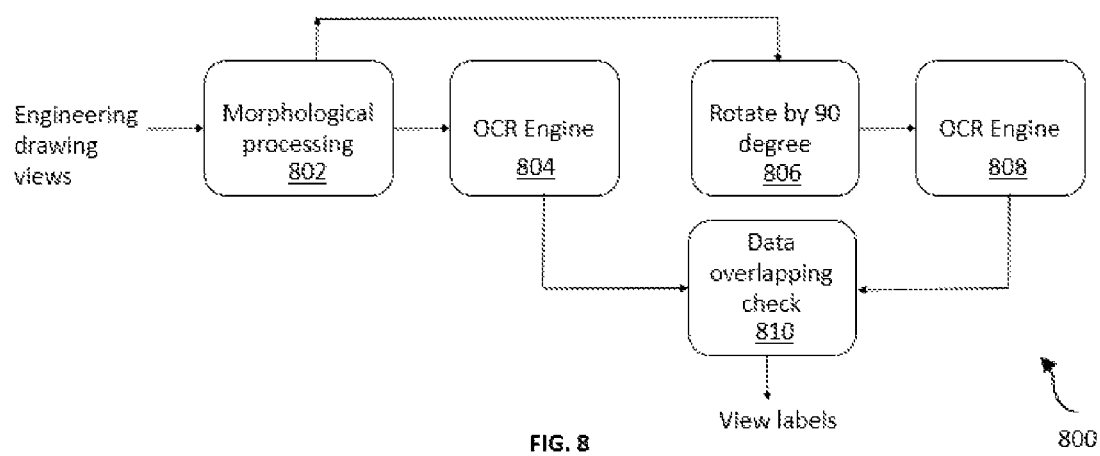
FIG. 8 illustrates a schematic block diagram representation 800 of a view label extraction technique used by the system 200 of FIG. 2 or the DDEMS 106 of FIG. 1 for extracting view labels from primary and secondary views, in accordance with an embodiment of the present disclosure.

FIG. 8, with reference to FIGS. 1 through 7B, illustrates a schematic block diagram representation 800 of a view label extraction technique used by the system 200 of FIG. 2 or the DDEMS 106 of FIG. 1 for extracting view labels from primary and secondary views, in accordance with an embodiment of the present disclosure.

As discussed previously, the hardware processors 204 of the DDEMS 200 extract the one or more primary views (i.e., isometric views) and the one or more secondary views (i.e., front view, secondary views, top view etc.) from the engineering drawing image included in the engineering drawing document. Once the primary and secondary views that are present in the engineering drawing image are available, the hardware processors 204 may perform morphological operations, such as gaussian denoising, re-scaling, thresholding, and mild image erosion on the primary and secondary views as part of pre-processing to obtain pre-processed engineering drawing views (see, 802).

Thereafter, the hardware processors 204 may the provide the pre-processed engineering drawing views to an OCR engine/OCR technique to extract the data present in the processed engineering drawing views (refer, 804). The data extracted at this stage may include the view labels that are provided in a horizontal direction in the pre-processed engineering drawing views.

To extract the view labels that are provided in a vertical direction in the processed engineering drawing views, the hardware processors 204 may rotate the pre-processed engineering drawing views that include the vertical view labels by 90 degrees (refer, 806). After the rotation, the hardware processors 204 may provide the pre-processed engineering drawing views to the OCR engine for extracting the data i.e., view labels present in the pre-processed engineering drawing views (refer, 808).

Once the view labels are extracted with or without rotation, the hardware processors 204 check whether there is any overlap in the view labels (refer, 810). The hardware processors 204 may remove the redundant view labels at this step.

FIG. 9, with reference to FIGS. 1-8, illustrates an exemplary flow diagram 900 of a method for performing a cognitive engineering drawing search using the system 200 of FIG. 1 and the DDEMS 106 of FIG. 2, in accordance with an embodiment of the present disclosure. The steps of the method of the present disclosure will now be explained with reference to the components of the system 200 as depicted in FIG. 1, and the DDEMS 106 of FIG. 2.

In an embodiment of the present disclosure, at step 902, the one or more hardware processors 204 of the DDEMS 200 receive a search request from a data searcher device 200 (e.g., the data searcher device 102*b* shown in FIG. 1) associated with a data searcher (e.g., the data searcher 104*b*). The search request comprising at least one of one or more search keywords, one or more engineering drawing views, an engineering drawing image associated with a searched object, and result count information. The search keywords may include any words that can represent the searched object in some way. The result count information includes a count of the number of search results user wants to see for the searched object.

At step 904, the one or more hardware processors 204 of the DDEMS 200 determine one or more engineering drawing documents whose table data is matching with the one or more search keywords based on one or more pre-defined matching criteria. In an embodiment, the predefined matching criteria include performing a character-by-character similarity check between the stored table data and the search keywords. Also, a similarity percentage score is computed for each similarity check performed between the table data and the search keywords. Thereafter, the similarity percentage score is compared with a predefined threshold percentage. If the similarity percentage score is found to be greater than the predefined threshold percentage, the engineering drawing document associated with the same table data will be considered as matching otherwise non-matching. For example, let's consider the similarity percentage score computed for a similarity check is found to be '70%' and the predefined threshold percentage defined for the same purpose is '75%'. In this case, the hardware processors 204 may consider the engineering drawing document as non-matching due to the unfulfillment of the predefined matching criteria. So, the engineering drawing documents whose table data is found to be matching are considered as shortlisted engineering drawing documents at this step. In case of only the keyword-based search, the step 906 and 908 will not be performed and the matching documents will be displayed on the data searcher device based on the result count information.

In an embodiment of the present disclosure, at step 906, the one or more hardware processors 204 of the DDEMS 200, in case of cognitive engineering drawing search, compare the one or more engineering drawing views with one or more primary views and one or more secondary views of each determined engineering drawing document to generate a feature-based comparison score for the corresponding determined engineering drawing document. The above step 906 can be better understood by way of following description.

In an embodiment, the one or more engineering drawing views or the engineering drawing image included in the search request can be skewed. So, a skew correction technique is applied over the engineering drawing views or the engineering drawing views included in the engineering drawing image to obtain the skew corrected engineering drawing views.

Further, the skew corrected engineering drawing views are compared with the one or more primary views and one or more secondary views of each shortlisted engineering drawing documents based on feature variants like vertices and corners to obtain the feature-based comparison score for the respective engineering drawing document. In one embodiment, the feature variants are computed by passing the skew corrected engineering drawing views through Gaussian filters and blurring filters, and by applying k-means clustering. The feature-based comparison score represents the degree of a match between the views of the engineering drawing document and the views included in the search query. So, a higher value of the feature-based comparison score represents the higher degree of comparison.

In an embodiment of the present disclosure, at step 908, the one or more hardware processors 204 of the DDEMS 200 arrange the one or more determined engineering drawing documents (i.e., the shortlisted engineering drawing document) in a list based on, at least in part of, a decreasing order of the feature-based comparison score obtained for each determined engineering drawing document and the result count information. At this step, the list is created. The engineering drawing documents with higher feature-based comparison score are included in the list. The number of engineering drawing documents that are included in the list depends on the result count information. For example, if result count information includes '10' and there are '20' matching engineering drawing documents that are available. Then only top 10 engineering drawing documents will be added in the list.

At step 910, the one or more hardware processors 204 of the DDEMS 200 displays the created list on the data searcher device. The data searcher can now view the available products and the engineering drawing data associated with the available products that are matching with the searched products.

In an embodiment, the DDEMS 200 also provides translation of the engineering drawing data in a desired language using a data translation engine. It should be noted that the data translation engine can be any translation engine known in the art. So, in case the data searcher wants to convert the engineering drawing data associated with a particular product in a language other the used language, the data searcher can perform the translation using the data searcher device.

Engineering drawings hold useful implications in the manufacturing sector. With the ability to digitize old available engineering drawings, the need of redesigning similar products is eliminated as a user can easily access information about the similar available product. In the present application, systems and methods are provided for extracting, digitizing, and using engineering drawing data. Firstly, the data extraction algorithm used for extracting and mapping table data can extract all types of table data irrespective of the pattern, data language and the data included in the table, thereby ensuring dynamic table data extraction with enhanced data mapping. Secondly, with automated primary and secondary view identification, a proper categorization of engineering drawing data is made possible which is further utilized to support cognitive search. Thirdly, data translation in desired language is supported by the system, thereby overcoming the challenge of understanding the multi-lingual data usually found in the engineering drawings.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
receiving, by an engineering drawing data extraction and management system (DDEMS) via one or more hardware processors, an engineering drawing document and a template information associated with the engineering drawing document from a data creator device associated with a data creator, the engineering drawing document comprising one or more engineering drawing views associated with an engineering drawing image of an object and one or more tables;
identifying, by the DDEMS via the one or more hardware processors, table location of a table of the one or more tables in the engineering drawing document based on the template information, the table comprising one or more cells;
extracting, by the DDEMS via the one or more hardware processors, text data present in each cell of the one or more cells of the table in the table location as table data using a data extraction algorithm;
identifying, by the DDEMS via the one or more hardware processors, one or more isometric views from the one or more engineering drawing views present in the engineering drawing document as one or more primary views using a color masking and an image area property technique;
identifying, by the DDEMS via the one or more hardware processors, one or more secondary views from the one or more engineering drawing views using a pretrained machine learning based model;
extracting, by the DDEMS via the one or more hardware processors, view labels and view coordinate information from one or more primary views and one or more secondary views using a view label extraction technique; and
displaying, by the DDEMS via the one or more hardware processors, the table data, the one or more primary views, the one or more secondary views, the view labels and the view coordinate information as an engineering drawing data for the engineering drawing document on the data creator device.

2. The processor implemented method of claim 1, further comprising:
facilitating, by the DDEMS via the one or more hardware processors, editing of the engineering drawing data for the engineering drawing document by the data creator to obtain an updated engineering drawing data for the engineering drawing document; and
storing, by the DDEMS via the one or more hardware processors, the updated engineering drawing data for the engineering drawing document in a database.

3. The processor implemented method of claim 1, wherein the step of identifying, by the DDEMS via the one or more hardware processors, table location is preceded by:
pre-processing, by the DDEMS via the one or more hardware processors, the received engineering drawing document to obtain a pre-processed engineering drawing document, the pre-processed engineering drawing document comprising pre-processed engineering drawing views associated with the engineering drawing image of the object.

4. The processor implemented method of claim 2, wherein the step of identifying, by the DDEMS via the one or more hardware processors, the one or more isometric views from the one or more drawing views present in the engineering drawing document as primary views further comprises:
performing, by the DDEMS via the one or more hardware processors, masking of the identified one or more isometric views in the pre-processed engineering drawing views present in the pre-processed engineering drawing document.

5. The processor implemented method of claim 2, wherein the step of extracting, by the DDEMS via the one or more hardware processors, text data present in each cell of the one or more cells of the table in the table location as table data using the data extraction algorithm comprises:
extracting, by the DDEMS via the one or more hardware processors, a table region associated with the table in the pre-processed engineering drawing document using the table location based on a predefined criteria;
performing, by the DDEMS via the one or more hardware processors, rescaling on the table region using a predefined scale factor to obtain a rescaled table;
applying, by the DDEMS via the one or more hardware processors, thresholding on the rescaled table using a thresholding technique to obtain a clear table;

performing, by the DDEMS via the one or more hardware processors, erosion of the clear table to obtain an eroded table;

extracting, by the DDEMS via the one or more hardware processors, text data present in each cell of the eroded table using a data mapping mechanism; and performing, by the DDEMS via the one or more hardware processors, masking of the table region associated with the table in the pre-processed engineering drawing document.

6. The processor implemented method of claim 5, wherein the data mapping mechanism comprises:

identifying each cell present in the table;

reading text data present in each identified cell;

identifying expected data type for each identified cell based on the text data of the respective cell;

performing a comparison of actual data type and the expected data type for each identified cell;

checking text data of neighboring cells around the corresponding identified cell to determine probable data for the identified cell based on the comparison, wherein the probable data is determined based on the expected data type; and saving probable data as the text data for each identified cell whose actual data type and the expected data type differ based on the comparison.

7. The processor implemented method of claim 1, wherein the one or more secondary views comprise one or more of: front views, top views, bottom views, left side views, right side views, assembly views, and invalid views associated with the engineering drawing image of the object.

8. The processor implemented method of claim 1, further comprising:

receiving, by the DDEMS via the one or more hardware processors, a search request from a data searcher device associated with a data searcher, the search request comprising at least one of one or more search keywords, one or more engineering drawing views, an engineering drawing image associated with a searched object, and result count information;

determining, by the DDEMS via the one or more hardware processors, one or more engineering drawing documents whose table data is matching with the one or more search keywords based on one or more predefined matching criteria;

comparing, by the DDEMS via the one or more hardware processors, the one or more engineering drawing views with one or more primary views and one or more secondary views of each determined engineering drawing document to generate a feature-based comparison score for the corresponding determined engineering drawing document;

arranging, by the DDEMS via the one or more hardware processors, the one or more determined engineering drawing documents in a list based on, at least in part of, a decreasing order of the feature-based comparison score obtained for each determined engineering drawing document and the result count information; and displaying, by the DDEMS via the one or more hardware processors, the list on the data searcher device.

9. The processor implemented method of claim 1, wherein the pretrained machine learning based model is a RetinaNet model.

10. An engineering drawing data extraction and management system (DDEMS), comprising:

a memory storing instructions;

one or more communication interfaces; and one or more hardware processors coupled to the memory via the one or more communication interfaces, wherein the one or more hardware processors are configured by the instructions to:

receive an engineering drawing document and a template information associated with the engineering drawing document from a data creator device associated with a data creator, the engineering drawing document comprising one or more engineering drawing views associated with an engineering drawing image of an object and one or more tables;

identify table location of a table of the one or more tables in the engineering drawing document based on the template information, the table comprising one or more cells;

extract text data present in each cell of the one or more cells of the table in the table location as table data using a data extraction algorithm;

identify one or more isometric views from the one or more engineering drawing views present in the engineering drawing document as one or more primary views using a color masking and an image area property technique;

identify one or more secondary views from the one or more engineering drawing views using a pretrained machine learning based model;

extract view labels and view coordinate information from one or more primary views and one or more secondary views using a view label extraction technique; and display the table data, the one or more primary views, the one or more secondary views, the view labels and the view coordinate information as an engineering drawing data for the engineering drawing document on the data creator device.

11. The system of claim 10, wherein the one or more hardware processors are configured by the instructions to:

facilitating editing of the engineering drawing data for the engineering drawing document by the data creator to obtain an updated engineering drawing data for the engineering drawing document; and storing the updated engineering drawing data for the engineering drawing document in a database.

12. The system of claim 10, wherein the step of identifying the table location is preceded by:

pre-processing the received engineering drawing document to obtain a pre-processed engineering drawing document, the pre-processed engineering drawing document comprising pre-processed engineering drawing views associated with the engineering drawing image of the object.

13. The system of claim 12, wherein the step of identifying the one or more isometric view drawing images from the one or more drawing images present in the engineering drawing document as primary view drawing images further comprises:

performing masking of the identified one or more isometric views in the pre-processed engineering drawing views present in the pre-processed engineering drawing document.

14. The system of claim 12, wherein the step of extracting text data present in each cell of the one or more cells of the table in the table location as table data using the data extraction algorithm comprises:

extracting a table region associated with the table in the pre-processed engineering drawing document using the table location based on a predefined criteria;

performing rescaling on the table region using a predefined scale factor to obtain a rescaled table;

applying thresholding on the rescaled table using a thresholding technique to obtain a clear table;

performing erosion of the clear table to obtain an eroded table;

extracting text data present in each cell of the eroded table using a data mapping mechanism; and performing masking of the table region associated with the table in the pre-processed engineering drawing document.

15. The system of claim 14, wherein the data mapping mechanism comprises:

identifying each cell present in the table;

reading text data present in each identified cell;

identifying expected data type for each identified cell based on the text data of the respective cell;

performing a comparison of actual data type and the expected data type for each identified cell;

checking text data of neighboring cells around the corresponding identified cell to determine probable data for the identified cell based on the comparison, wherein the probable data is determined based on the expected data type; and saving probable data as the text data for each identified cell whose actual data type and the expected data type differ based on the comparison.

16. The system of claim 10, wherein the one or more secondary views comprise one or more of: front views, top views, bottom views, left side views, right side views, assembly views, and invalid views associated with the engineering drawing image of the object.

17. The system of claim 10, wherein the one or more hardware processors are configured by the instructions to:

receiving a search request from a data searcher device associated with a data searcher, the search request comprising at least one of one or more search keywords, one or more engineering drawing views, an engineering drawing image associated with a searched object, and result count information;

determining one or more engineering drawing documents whose table data is matching with the one or more search keywords based on one or more predefined matching criteria;

comparing the one or more engineering drawing views with one or more primary views and one or more secondary views of each determined engineering drawing document to generate a feature-based comparison score for the corresponding determined engineering drawing document;

arranging the one or more determined engineering drawing documents in a list based on, at least in part of, a decreasing order of the feature-based comparison score obtained for each determined engineering drawing document and the result count information; and displaying the list on the data searcher device.

18. The system of claim 10, wherein the pretrained machine learning based model is a RetinaNet model.

19. One or more non-transitory machine-readable information storage mediums comprising one or more instructions which when executed by one or more hardware processors cause:

receiving, by an engineering drawing data extraction and management system (DDEMS) an engineering drawing document and a template information associated with the engineering drawing document from a data creator device associated with a data creator, the engineering drawing document comprising one or more engineering drawing views associated with an engineering drawing image of an object and one or more tables;

identifying, by the DDEMS via the one or more hardware processors, table location of a table of the one or more tables in the engineering drawing document based on the template information, the table comprising one or more cells;

extracting, by the DDEMS via the one or more hardware processors, text data present in each cell of the one or more cells of the table in the table location as table data using a data extraction algorithm;

identifying, by the DDEMS via the one or more hardware processors, one or more isometric views from the one or more engineering drawing views present in the engineering drawing document as one or more primary views using a color masking and an image area property technique;

identifying, by the DDEMS via the one or more hardware processors, one or more secondary views from the one or more engineering drawing views using a pretrained machine learning based model;

extracting, by the DDEMS via the one or more hardware processors, view labels and view coordinate information from one or more primary views and one or more secondary views using a view label extraction technique; and displaying, by the DDEMS via the one or more hardware processors, the table data, the one or more primary views, the one or more secondary views, the view labels and the view coordinate information as an engineering drawing data for the engineering drawing document on the data creator device.

* * * * *